US011137179B2

(12) United States Patent
Furugaki et al.

(10) Patent No.: US 11,137,179 B2
(45) Date of Patent: Oct. 5, 2021

(54) REFRIGERATION APPARATUS

(71) Applicant: DAIKIN INDUSTRIES, LTD., Osaka (JP)

(72) Inventors: Takashi Furugaki, Osaka (JP); Masaru Tanaka, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 17/129,240

(22) Filed: Dec. 21, 2020

(65) Prior Publication Data

US 2021/0108836 A1 Apr. 15, 2021

Related U.S. Application Data

(63) Continuation of application No. PCT/JP2019/022571, filed on Jun. 6, 2019.

(30) Foreign Application Priority Data

Jun. 22, 2018 (JP) .............................. JP2018-118566

(51) Int. Cl.
*F16C 27/06* (2006.01)
*F25B 31/00* (2006.01)
(Continued)

(52) U.S. Cl.
CPC ........ *F25B 31/002* (2013.01); *F04C 15/0092* (2013.01); *F04C 28/28* (2013.01);
(Continued)

(58) Field of Classification Search
CPC .... F16C 25/02; F16C 27/063; F16C 33/6681; F16C 2233/00; F16C 2360/00; F25B 1/04;
(Continued)

(56) References Cited

U.S. PATENT DOCUMENTS 5,688,109 A * 11/1997 Matsuura .............. F04C 29/021
417/228
8,590,325 B2 * 11/2013 Pham .................... F25B 49/022
62/129
(Continued)

FOREIGN PATENT DOCUMENTS

CN 2628217 Y 7/2004
DE 102013100410 A1 * 5/2014 ............ F25B 49/005
(Continued)

OTHER PUBLICATIONS

International Search Report of corresponding PCT Application No. PCT/JP2019/022571 dated Sep. 3, 2019.
(Continued)

*Primary Examiner* — Marcus Charles
(74) *Attorney, Agent, or Firm* — Global IP Counselors, LLP

(57) ABSTRACT

A refrigeration apparatus includes a compressor connected to a refrigerant circuit, and a bearing monitor. The compressor includes a compression mechanism, an electric motor, a drive shaft, and a plain bearing that supports a journal portion of the drive shaft. The bearing monitor performs an abnormal-state operation to cope with poor lubrication on the plain bearing if an abnormal state condition is satisfied. The abnormal state condition is a condition indicating that a rate of change of current exceeds a first reference value. The rate of change of current is an amount of change in a driving current usable to drive the compressor per unit time. The journal portion of the drive shaft has a surface roughness of at least 0.05 μm.

6 Claims, 4 Drawing Sheets

(51) Int. Cl.
*F16C 33/66* (2006.01)
*F04C 28/28* (2006.01)
*F04B 49/06* (2006.01)
*F04C 15/00* (2006.01)

(52) U.S. Cl.
CPC .......... *F16C 33/6681* (2013.01); *F04B 49/06* (2013.01); *F04B 2203/0201* (2013.01); *F16C 2233/00* (2013.01); *F16C 2360/00* (2013.01)

(58) Field of Classification Search
CPC .... F25B 31/002; F25B 31/02; F04C 15/0092; F04C 28/28; F04B 49/06; F04B 49/065
USPC ...... 62/129, 192; 384/26, 91, 129, 322, 528, 384/462; 417/228
See application file for complete search history.

(56) References Cited

U.S. PATENT DOCUMENTS

| | | | |
|---|---|---|---|
| 9,470,230 B2 * | 10/2016 | Koyama | F04B 39/0261 |
| 2004/0126261 A1 * | 7/2004 | Kammhoff | F04C 29/126 418/55.6 |
| 2005/0247073 A1 | 11/2005 | Hikawa et al. | |
| 2006/0176186 A1 | 8/2006 | Larson et al. | |
| 2009/0155111 A1 * | 6/2009 | Okaichi | F01C 21/108 418/29 |
| 2016/0047595 A1 * | 2/2016 | Williams | F25B 49/02 62/62 |
| 2018/0347879 A1 | 12/2018 | Tada et al. | |
| 2020/0056604 A1 | 2/2020 | Iida et al. | |

FOREIGN PATENT DOCUMENTS

| | | | | |
|---|---|---|---|---|
| EP | 0688855 A1 * | 12/1995 | ........ | C10M 169/041 |
| EP | 3121536 A1 * | 1/2017 | ........ | C10M 171/008 |
| EP | 3266709 A1 * | 1/2018 | .......... | G01M 13/04 |
| EP | 3301791 A1 * | 4/2018 | .............. | H02K 9/19 |
| JP | 63-171680 U | 11/1988 | | |
| JP | 2001-99070 A | 4/2001 | | |
| JP | 2004-60457 A | 2/2004 | | |
| JP | 4075429 B2 * | 4/2008 | .............. | F25B 9/008 |
| JP | 2008-261374 A | 10/2008 | | |
| JP | 2009-215884 A | 9/2009 | | |
| JP | 2010-84551 A | 4/2010 | | |
| JP | WO2017/042949 A1 | 3/2017 | | |
| JP | WO2015140949 A1 * | 4/2017 | .......... | F04B 39/0246 |
| WO | WO-2012021685 A1 * | 2/2012 | .......... | G08B 29/181 |
| WO | 2013/005394 A1 | 1/2013 | | |
| WO | 2013/055816 A1 | 4/2013 | | |
| WO | WO-2014203522 A1 * | 12/2014 | .............. | F25B 27/00 |
| WO | WO-2017141388 A1 * | 8/2017 | .............. | F25D 21/04 |
| WO | 2018/092849 A1 | 5/2018 | | |

OTHER PUBLICATIONS

International Preliminary Report of corresponding PCT Application No. PCT/JP2019/022571 dated Dec. 30, 2020.
European Search Report of corresponding EP Application No. 19 82 2074.1 dated Mar. 22, 2021.

* cited by examiner

REFRIGERATION APPARATUS

CROSS-REFERENCE TO RELATED APPLICATIONS

This is a continuation of International Application No. PCT/JP2019/022571 filed on Jun. 6, 2019, which claims priority to Japanese Patent Application No. 2018-118566 filed on Jun. 22, 2018. The entire disclosures of these applications are incorporated by reference herein.

BACKGROUND

Field of Invention

The present disclosure relates to a refrigeration apparatus.

Background Information

Brochure of WO 2017/042949 discloses an air conditioner including a failure predictor/detector for a compressor. This document shows that damage caused to a bearing of a drive shaft (a crankshaft) driving a compression mechanism by a shortage of lubricant and other factors causes variations in torque for driving the drive shaft, and the driving current of an electric motor driving the drive shaft consequently pulsates. The failure predictor/detector of this document predicts or detects a failure of the compressor based on the amplitude and duration of pulsations of the driving current of the compressor.

SUMMARY

A first aspect of the present disclosure is directed to a refrigeration apparatus. The refrigeration apparatus includes a compressor, a refrigerant circuit with the compressor connected thereto to circulate a refrigerant to perform a refrigeration cycle, and a bearing monitor. The compressor includes a compression mechanism configured to suck and compress a fluid, an electric motor, a drive shaft coupled to the electric motor to drive the compression mechanism, and a plain bearing that supports a journal portion of the drive shaft. The bearing monitor is configured to perform an abnormal-state operation to cope with poor lubrication on the plain bearing if an abnormal state condition indicating that a rate of change of current exceeds a first reference value is satisfied. The rate of change of current is an amount of change in a driving current usable to drive the compressor per unit time. The journal portion of the drive shaft having a surface roughness of at least 0.05 μm. The driving current of the compressor that is normally operating is defined as a rated current. The bearing monitor is configured to calculate the rated current in an operating state of the compressor at a time of determination regarding whether the abnormal state condition is satisfied or not. The bearing monitor is configured to use, as the abnormal state condition, a condition that a value obtained by dividing the rate of change of current by the rated current calculated exceeds a second reference value.

DETAILED DESCRIPTION OF EMBODIMENT(S)

First Embodiment

Figure 1:
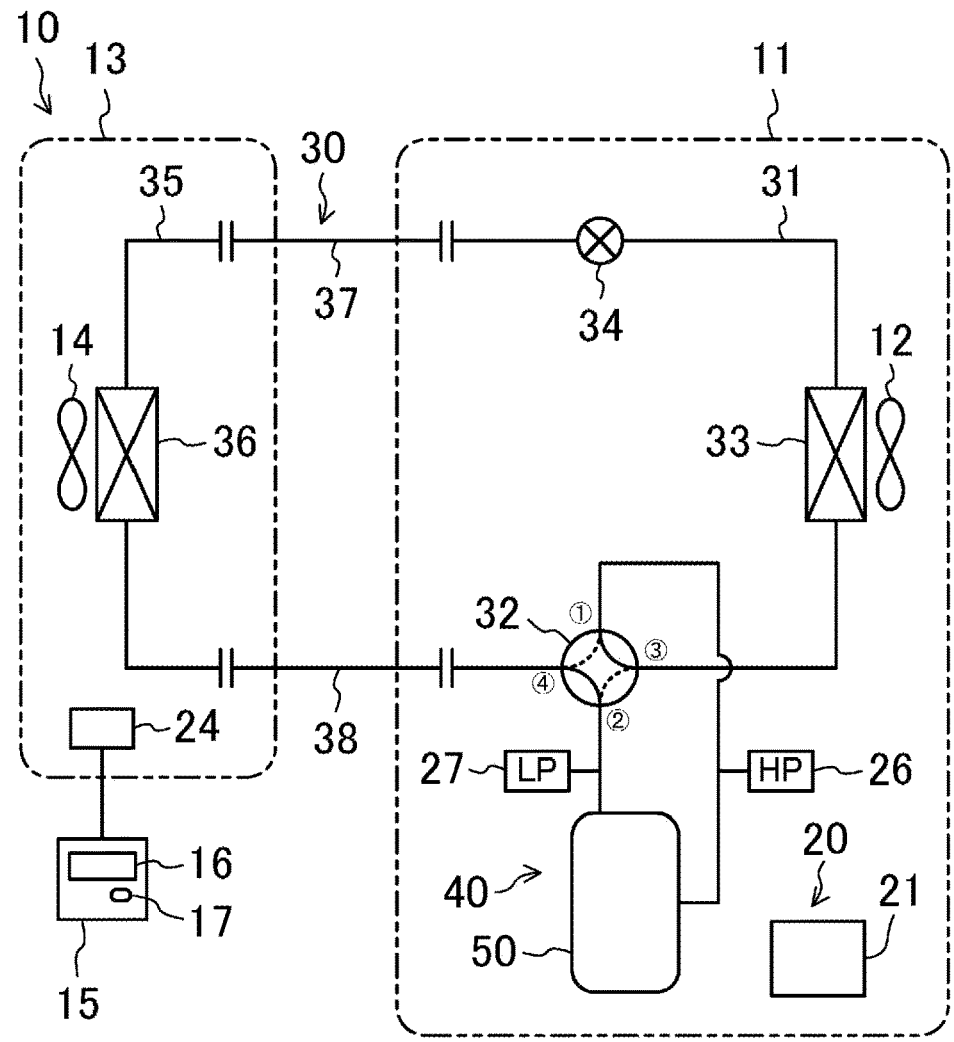
FIG. 1 is a piping system diagram illustrating a general configuration of an air conditioner according to a first embodiment.

A first embodiment will be described below. An air conditioner (10) according to this embodiment is a refrigeration apparatus that includes a compressor unit (40) and a refrigerant circuit (30).
Air Conditioner
General Configuration of Air Conditioner As shown in FIG. 1, the air conditioner (10) includes an outdoor unit (11) and an indoor unit (13). The outdoor unit (11) houses an outdoor circuit (31). The indoor unit (13) houses an indoor circuit (35). The outdoor circuit (31) and the indoor circuit (35) are connected together via a liquid side connection pipe (37) and a gas side connection pipe (38) to constitute the refrigerant circuit (30).
Refrigerant Circuit The outdoor circuit (31) is provided with a compressor (50), a four-way switching valve (32), an outdoor heat exchanger (33), and an expansion valve (34). In the outdoor circuit (31), the compressor (50) has a discharge pipe (53) connected to a first port of the four-way switching valve (32), and a suction pipe (52) connected to a second port of the four-way switching valve (32). The outdoor heat exchanger (33) has its gas end connected to a third port of the four-way switching valve (32), and has its liquid end connected to one end of the expansion valve (34). A fourth port of the four-way switching valve (32) is connected to one end of the gas side connection pipe (38). The other end of the expansion valve (34) is connected to one end of the liquid side connection pipe (37).

The compressor (50) is a hermetic scroll compressor. The compressor (50) constitutes the compressor unit (40) together with a main controller (21), which will be described later. Details of the compressor (50) will be described later. The outdoor heat exchanger (33) is a heat exchanger that allows heat exchange between a refrigerant in the refrigerant circuit (30) and outdoor air. The expansion valve (34) is a so-called "electronic expansion valve." The four-way switching valve (32) has four ports. The four-way switching valve (32) is configured to switch between a first state in which the first port communicates with the third port and the second port communicates with the fourth port (indicated by solid curves in FIG. 1), and a second state in which the first port communicates with the fourth port and the second port communicates with the third port (indicated by broken curves in FIG. 1).

The outdoor circuit (31) is further provided with a discharge pressure sensor (26) and a suction pressure sensor (27). The discharge pressure sensor (26) is connected to a pipe connecting the discharge pipe (53) of the compressor (50) and the first port of the four-way switching valve (32) to measure the pressure of the refrigerant discharged from the compressor (50). The suction pressure sensor (27) is connected to a pipe connecting the suction pipe (52) of the compressor (50) and the second port of the four-way switching valve (32) to measure the pressure of the refrigerant to be sucked into the compressor (50).

The indoor circuit (35) is provided with an indoor heat exchanger (36). The indoor circuit (35) has its liquid end connected to the other end of the liquid side connection pipe (37), and has its gas end connected to the other end of the gas side connection pipe (38). The indoor heat exchanger (36) is a heat exchanger that allows heat exchange between a refrigerant in the refrigerant circuit (30) and indoor air.

Outdoor Unit and Inverter

As shown in FIG. 1, the outdoor unit (11) is provided with, in addition to the outdoor circuit (31), an outdoor fan (12) and the main controller (21). The outdoor fan (12) is disposed near the outdoor heat exchanger (33), and supplies outdoor air to the outdoor heat exchanger (33). The main controller (21) is configured to control components of the outdoor unit (11). The main controller (21) will be described later.

Figure 2:
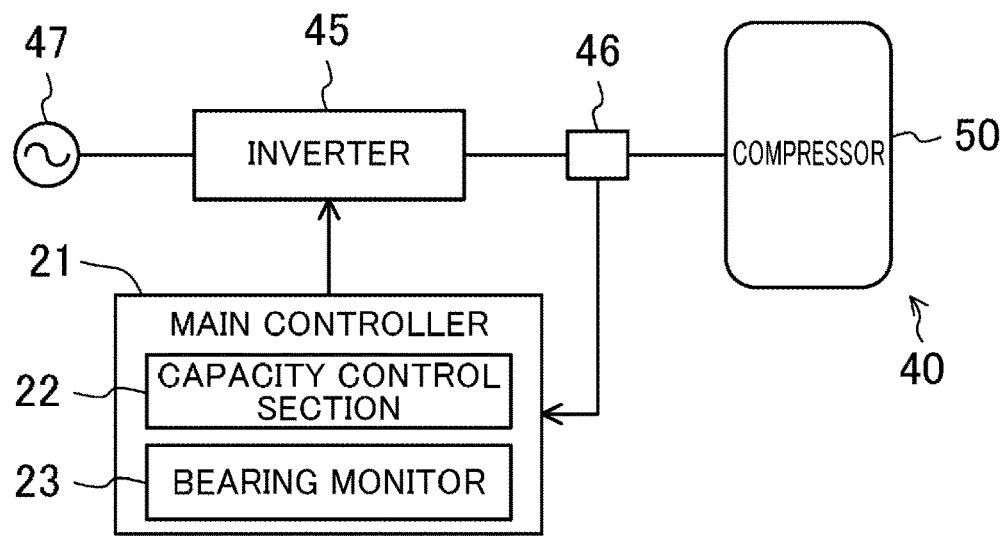
FIG. 2 is a schematic configuration diagram illustrating a compressor unit according to the first embodiment and a system through which power is supplied to a compressor.

As shown in FIG. 2, the outdoor unit (11) is provided with an inverter (45). The inverter (45) is configured to change the frequency of alternating current. The inverter (45) has its input electrically connected to a commercial power supply (47), and has its output electrically connected to the compressor (50). The output current of the inverter (45) is a driving current for driving the compressor (50). Changing the frequency of the output current of the inverter (45) causes a change in the rotational speed of the compressor (50). As a result, the operating capacity of the compressor (50) changes.

An electric wire connecting the inverter (45) and the compressor (50) is provided with a current sensor (46). The current sensor measures the effective value of alternating current supplied from the inverter to the compressor (50) (i.e., the driving current of the compressor (50)). The current sensor (46) outputs the measured effective value of the driving current to the main controller (21).

Indoor Unit and Remote Control Unit

As shown in FIG. 1, the indoor unit (13) is provided with an indoor fan (14) and an auxiliary controller (24). The indoor fan (14) is disposed near the indoor heat exchanger (36), and supplies indoor air to the indoor heat exchanger (36). The auxiliary controller (24) is configured to control components of the indoor unit (13).

The auxiliary controller (24) is connected to a remote control unit (15) so as to be capable of communicating with the remote control unit (15). The remote control unit (15) includes a display (16), and an operation button (17) operable by a user. The display (16) is a liquid crystal display. The display displays information indicating the operating state of the air conditioner (10) (e.g., the set temperature).

Operation of Air Conditioner

The air conditioner (10) selectively performs cooling operation and heating operation.

In the cooling operation, the main controller (21) places the four-way switching valve (32) in the first state (the state indicated by the solid curves in FIG. 1), and adjusts the operating capacity of the compressor (50) and the opening degree of the expansion valve (34). In the outdoor heat exchanger (33), a refrigerant discharged from the compressor (50) dissipates heat to outdoor air to condense. Then, the condensed refrigerant expands while passing through the expansion valve (34). The refrigerant that has passed through the expansion valve (34) flows through the liquid side connection pipe (37) into the indoor circuit (35), and absorbs heat from indoor air in the indoor heat exchanger (36) to evaporate. Then, the refrigerant flows through the gas side connection pipe (38) into the outdoor circuit (31), and is sucked into the compressor (50) and is compressed. The indoor unit (13) blows the air cooled in the indoor heat exchanger (36) into an indoor space.

In the heating operation, the main controller (21) places the four-way switching valve (32) in the second state (the state indicated by the broken curves in FIG. 1), and adjusts the operating capacity of the compressor (50) and the opening degree of the expansion valve (34). A refrigerant discharged from the compressor (50) flows through the gas side connection pipe (38) into the indoor circuit (35), and dissipates heat to indoor air in the indoor heat exchanger (36) to condense. Then, the refrigerant flows through the liquid side connection pipe (37) into the outdoor circuit (31), and expands while passing through the expansion valve (34). The refrigerant that has passed through the expansion valve (34) absorbs heat from outdoor air in the outdoor heat exchanger (33) to evaporate. Then, the evaporated refrigerant is sucked into the compressor (50) and is compressed. The indoor unit (13) blows the air heated in the indoor heat exchanger (36) into the indoor space.

Compressor

Figure 3:
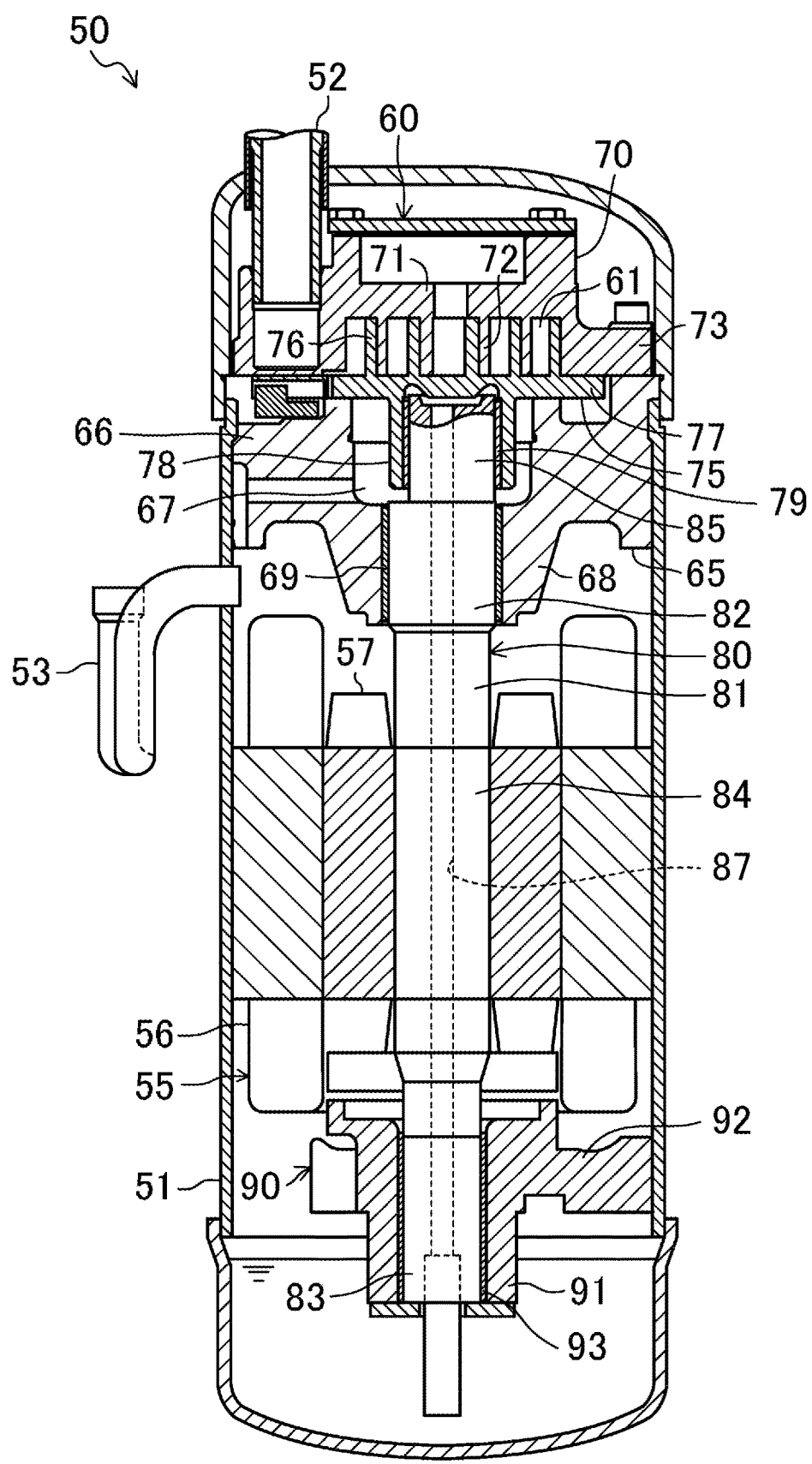
FIG. 3 is a vertical cross-sectional view of a compressor (scroll compressor) according to the first embodiment.

As shown in FIG. 3, the compressor (50) is a hermetic scroll compressor. The compressor (50) includes a compression mechanism (60), an electric motor (55), a drive shaft (80), a lower bearing (90), and a casing (51). The compression mechanism (60), the electric motor (55), the drive shaft (80), and the lower bearing (90) are housed in the casing (51).

Casing

The casing (51) is a cylindrical closed container with both ends closed. The casing (51) is arranged so that its axial direction coincides with a vertical direction. The compression mechanism (60), the electric motor (55), and the lower bearing (90) are sequentially arranged in the internal space of the casing (51) from top to bottom. The casing (51) is provided with the suction pipe (52) and the discharge pipe (53). The suction pipe (52) passes through the top of the casing (51), and is connected to the compression mechanism (60). The discharge pipe (53) passes through the barrel of the casing (51), and is open in the internal space of the casing (51).

Compression Mechanism

The compression mechanism (60) is a scroll fluid machine. The compression mechanism (60) includes a fixed scroll (70), an orbiting scroll (75), and a housing (65). Wraps of the fixed and orbiting scrolls (70) and (75) mesh with each other to form a plurality of compression chambers (61). The housing (65) is fixed to the casing (51), and the fixed scroll (70) is fixed to the housing (65).

The orbiting scroll (75) includes an orbiting end plate (77), an orbiting wrap (76), and a boss (78). The orbiting end plate (77) is formed into a substantially circular flat plate. The orbiting wrap (76) is formed in a spiral wall shape, and protrudes from a front surface (upper surface in FIG. 3) of the orbiting end plate (77). The boss (78) is formed in a cylindrical shape protruding from a back surface (lower surface in FIG. 3) of the orbiting end plate (77), and is positioned at a center portion of the orbiting end plate (77).

An eccentric shaft portion (85) of the drive shaft (80), which will be described later, is inserted into the boss (78). A first bearing metal (79) is fitted into the boss (78). This boss (78) is a plain bearing supported by the eccentric shaft portion (85) of the drive shaft (80).

The fixed scroll (70) includes a fixed end plate (71), a fixed wrap (72), and an outer peripheral wall portion (73). The fixed end plate (71) is a relatively thick, flat plate-shaped portion located at an upper portion of the fixed scroll (70). The fixed wrap (72) is formed in a spiral wall shape, and protrudes from a front surface (lower surface in FIG. 3) of the fixed end plate (71). The outer peripheral wall portion (73) surrounds the outer periphery of the fixed wrap (72), and protrudes from the front surface of the fixed end plate (71).

The housing (65) includes a main body (66) and a main bearing portion (68). The main body (66) is formed in the shape of a thick disk. A crank chamber (67) is formed in a center portion of the main body (66). The crank chamber (67) is a cylindrical recess that opens in a front surface (upper surface in FIG. 3) of the main body (66). The main bearing portion (68) is formed in a cylindrical shape protruding from a back surface (lower surface in FIG. 3) of the main body (66), and is positioned at a center portion of the main body (66). The main bearing portion (68) has a through hole into which the drive shaft (80) is inserted. A second bearing metal (69) is fitted into the through hole. This main bearing portion (68) is a plain bearing that supports the drive shaft (80).

Electric Motor

The electric motor (55) includes a stator (56) and a rotor (57). The stator (56) is fixed to the barrel of the casing (51). The rotor (57) is disposed inside the stator (56). The drive shaft (80) is inserted into the rotor (57).

Lower Bearing

The lower bearing (90) includes one auxiliary bearing portion (91) and three legs (92). The auxiliary bearing portion (91) is formed in the shape of a thick cylinder. A third bearing metal (93) is fitted into the auxiliary bearing portion (91). This auxiliary bearing portion (91) is a plain bearing that supports the drive shaft (80). The legs (92) extend radially from the auxiliary bearing portion (91). The protruding ends of the legs (92) of the lower bearing (90) are fixed to the barrel of the casing (51).

Drive Shaft

The drive shaft (80) includes a main shaft portion (81) and the eccentric shaft portion (85). The main shaft portion (81) includes a main journal portion (82), an auxiliary journal portion (83), and an intermediate shaft portion (84). The drive shaft (80) is arranged such that the eccentric shaft portion (85) is located above the main shaft portion (81).

The main journal portion (82), the intermediate shaft portion (84), and the auxiliary journal portion (83) are sequentially arranged from one end to the other end of the main shaft portion (81). The main journal portion (82), the intermediate shaft portion (84), and the auxiliary journal portion (83) are each formed in a columnar shape, and are coaxial with one another. In the main shaft portion (81) of this embodiment, the main journal portion (82) has a larger diameter than the intermediate shaft portion (84), and the auxiliary journal portion (83) has a smaller diameter than the intermediate shaft portion (84). The main shaft portion (81) of this embodiment has upper and lower portions respectively provided with the main journal portion (82) and the auxiliary journal portion (83).

The main journal portion (82) is inserted into the main bearing portion (68) of the housing (65). The auxiliary journal portion (83) is inserted into the auxiliary bearing portion (91) of the lower bearing (90). The drive shaft (80) has its main journal portion (82) supported by the main bearing portion (68), and has its auxiliary journal portion (83) supported by the auxiliary bearing portion (91). The intermediate shaft portion (84) is inserted into the rotor (57) of the electric motor (55). The rotor (57) is fixed to the intermediate shaft portion (84).

The eccentric shaft portion (85) is in the shape of a relatively short shaft, and protrudes from an end face of the main journal portion (82). The drive shaft (80) according to this embodiment has its eccentric shaft portion (85) located near the upper end thereof. A shaft center of the eccentric shaft portion (85) is substantially parallel to that of the main shaft portion (81), and is eccentric with the shaft center of the main shaft portion (81). The eccentric shaft portion (85) is inserted into the boss (78) of the orbiting scroll (75). The eccentric shaft portion (85) forms a journal portion that supports the boss (78) of the orbiting scroll (75).

As described above, the main journal portion (82), the auxiliary journal portion (83), and the eccentric shaft portion (85) of the drive shaft (80) according to this embodiment each form a journal portion supported by an associated one of the plain bearings. The main journal portion (82) and the eccentric shaft portion (85) of the drive shaft (80) according to this embodiment each have a surface roughness Ra greater than or equal to 0.05 μm. The surface roughness Ra is an arithmetic average roughness. The reason why the surface roughness Ra of each of the main journal portion (82) and the eccentric shaft portion (85) is set to be greater than or equal to 0.05 μm will be described later.

An oil supply passage (87) is formed in the drive shaft (80). The oil supply passage (87) is a passage through which lubricant (refrigerating machine oil) stored at the bottom of the casing (51) is supplied to sliding portions. The lubricant is supplied through the oil supply passage (87) to the main bearing portion (68), the auxiliary bearing portion (91), the boss (78), and the sliding portions of the drive shaft (80).

Control System

In the air conditioner (10) according to this embodiment, the main controller (21) of the outdoor unit (11) and the auxiliary controller (24) of the indoor unit (13) are connected to each other through a wire to form a control system (20).

Although not shown, the main controller (21) and the auxiliary controller (24) each include a CPU that executes a control program, and a memory that stores the control program, and data and other elements necessary for executing the control program.

As described above, the main controller (21) is configured to control components of the outdoor unit (11). For example, the main controller (21) adjusts the rotational speed of the outdoor fan (12) and the opening degree of the expansion valve (34), and operates the four-way switching valve (32). As shown in FIG. 2, the main controller (21) includes a capacity control section (22) and a bearing monitor (23). The capacity control section (22) and the bearing monitor (23) will be described later.

As described above, the auxiliary controller (24) is configured to control components of the indoor unit (13). For example, the main controller (21) adjusts the rotational speed of the outdoor fan (12) and the opening degree of the expansion valve (34), and operates the four-way switching valve (32). The auxiliary controller (24) adjusts the rotational speed of the indoor fan (14).

Capacity Control Section

The capacity control section (22) is configured to adjust the operating capacity of the compressor (50) so that the air conditioner (10) demonstrates the air conditioning capacity commensurate with the air conditioning load in the indoor space.

If the air conditioning capacity of the air conditioner (10) is low with respect to the air conditioning load in the indoor space, the capacity control section (22) outputs, to the inverter (45), an instruction signal for increasing the output frequency of the inverter (45). Increasing the output frequency of the inverter (45) causes an increase in the rotational speed of the compressor (50). As a result, the operating capacity of the compressor (50) increases, and the air conditioning capacity of the air conditioner (10) increases.

During the cooling operation, for example, if a value measured by the suction pressure sensor (27) is above a target value of the low pressure of the refrigeration cycle, the capacity control section (22) determines that the air conditioning capacity of the air conditioner (10) is low with respect to the air conditioning load in the indoor space. On the other hand, during the heating operation, for example, if a value measured by the discharge pressure sensor (26) is below a target value of the high pressure of the refrigeration cycle, the capacity control section (22) determines that the air conditioning capacity of the air conditioner (10) is low with respect to the air conditioning load in the indoor space.

If the air conditioning capacity of the air conditioner (10) is high with respect to the air conditioning load in the indoor space, the capacity control section (22) outputs, to the inverter (45), an instruction signal for reducing the output frequency of the inverter (45). Reducing the output frequency of the inverter (45) causes a decrease in the rotational speed of the compressor (50). As a result, the operating capacity of the compressor (50) decreases, and the air conditioning capacity of the air conditioner (10) decreases.

During the cooling operation, for example, if the value measured by the suction pressure sensor (27) is below the target value of the low pressure of the refrigeration cycle, the capacity control section (22) determines that the air conditioning capacity of the air conditioner (10) is high with respect to the air conditioning load in the indoor space. On the other hand, during the heating operation, for example, if the value measured by the discharge pressure sensor (26) is above the target value of the high pressure of the refrigeration cycle, the capacity control section (22) determines that the air conditioning capacity of the air conditioner (10) is high with respect to the air conditioning load in the indoor space.

Bearing Monitor

The bearing monitor (23) is configured to sense poor lubrication on the plain bearings (68, 78) based on a value measured by the current sensor (46) (i.e., the effective value of the driving current of the compressor). Specifically, the bearing monitor (23) repeatedly performs a determination operation to determine whether an abnormal state condition has been satisfied or not every predetermined time period (e.g., every 30 seconds). The abnormal state condition is a condition that indicates that the plain bearings (68, 78) are poorly lubricated. If the abnormal state condition is satisfied, the bearing monitor (23) performs an abnormal-state operation for coping with poor lubrication on the plain bearings (68, 78).

Determination Operation

The determination operation of the bearing monitor (23) will be described below. In the bearing monitor (23) according to this embodiment, the abnormal state condition is a condition where the generalized rate RIg of change of current exceeds a determination reference value (second reference value).

First, the bearing monitor (23) calculates the rate RI of change of current. The rate RI of change of current is the amount of change in the driving current for driving the compressor (50) per unit time (in this embodiment, per second). The bearing monitor (23) calculates the amount of change in the value Is measured by the current sensor (46) (i.e., the effective value of the driving current of the compressor (50)) per unit time, and uses this amount as the rate of change of current.

Next, the bearing monitor (23) calculates the rated current Ir in the operating state of the compressor (50) at that moment. The rated current Ir is the driving current of the normally operating compressor (50) (in this embodiment, the effective value of alternating current supplied from the inverter (45) to the compressor (50)). The rated current Ir varies depending on the operating states of the compressor (50). The bearing monitor (23) stores, in advance, a formula for calculating the rated current Ir based on the suction and discharge pressures of the compressor (50) and the rotational speed of the compressor (50). The bearing monitor (23) uses a value obtained by substituting, into the formula, the value measured by the suction pressure sensor (27), the value measured by the discharge pressure sensor (26), and the output frequency of the inverter (45) as the rated current Ir in the operating state of the compressor (50) at that moment.

Subsequently, the bearing monitor (23) performs an arithmetic computation in which the rate RI of change of current is divided by the rated current Ir, and uses the value obtained by the arithmetic computation as the generalized rate RIg of change of current (=RI/Ir).

The bearing monitor (23) stores a predetermined value as the determination reference value H, and compares the calculated generalized rate RIg of change of current with the determination reference value H. The determination reference value H is the second reference value. If the generalized rate RIg of change of current is greater than the determination reference value H (RIg>H), the bearing monitor (23) determines that the abnormal state condition is satisfied. In other words, when the generalized rate RIg of change of current exceeds the determination reference value H for the first time, the bearing monitor (23) according to this embodiment determines that the abnormal state condition has been satisfied.

A situation where the generalized rate RIg of change of current exceeds the determination reference value H (RIg>H) means that the rate RI of change of current exceeds "the product of the determination reference value H and the rated current Ir (H×Ir)." Thus, the abnormal state condition of this embodiment is a condition indicating that the rate RI of change of current has exceeded a first reference value (in this embodiment, H×Ir).

As can be seen, the compressor unit (40) according to this embodiment includes the bearing monitor (23) configured to perform the abnormal-state operation for coping with poor lubrication on the plain bearings (68, 78) if a predetermined abnormal state condition is satisfied. The bearing monitor (23) is configured to calculate the rated current in the operating state of the compressor (50) at the time of determination regarding whether the abnormal state condition is satisfied or not, and use, as the abnormal state condition, the "condition that a value obtained by dividing the rate RI of change of current by the calculated rated current Ir (i.e., the generalized rate RIg of change of current) exceeds the determination reference value H."

Abnormal-State Operation

The abnormal-state operation of the bearing monitor (23) will be described below. This abnormal-state operation needs to be performed if the plain bearings (68, 78) are poorly lubricated.

The bearing monitor (23) performs an operation for changing the operating state of the compressor (50) from a normal state to a lightly loaded state as the abnormal-state operation. The bearing monitor (23) performs this operation every time the abnormal state condition is satisfied.

The normal state is an operating state of the compressor (50) while the abnormal state condition is not satisfied. In the normal state, the rotational speed of the compressor (50) is a value set by the capacity control section (22). On the other hand, the lightly loaded state is an operating state of the compressor (50) in which the load acting on the plain bearings (68, 78) is lighter than the load at the time of determination regarding whether the abnormal state condition is satisfied or not. The rotational speed of the compressor (50) in the lightly loaded state according to this embodiment is lower than the rotational speed of the compressor (50) at the time of determination regarding whether the abnormal state condition is satisfied or not.

Thus, the bearing monitor (23) performs an operation that draws the rotational speed of the compressor (50) down below the rotational speed at the time of determination operation (specifically, an operation that draws the output frequency of the inverter (45) down below the value set by the capacity control section (22) at the time of determination operation) as the abnormal-state operation.

After the operating state of the compressor (50) is changed from the normal state to the lightly loaded state, the bearing monitor (23) measures the duration of the lightly loaded state. While the lightly loaded state continues, the lubricant remaining in the heat exchangers (33, 36) and other components of the refrigerant circuit (30) may return to the compressor (50) together with the refrigerant. This may allow sufficient oil to be supplied to the plain bearings (68, 78).

If the duration of the lightly loaded state reaches a predetermined reference time period, the bearing monitor (23) restores the operating state of the compressor (50) from the lightly loaded state to the normal state. In this case, the bearing monitor (23) restores the operating capacity of the compressor (50) (specifically, the output frequency of the inverter (45)) to a value immediately before the operating state of the compressor (50) changes to the lightly loaded state.

The bearing monitor (23) according to this embodiment performs an operation for giving a warning of poor lubrication on the plain bearings (68, 78) as the abnormal-state operation. The bearing monitor (23) performs this operation if the number of times the abnormal state condition is satisfied reaches a predetermined number of times (e.g., three times). This is because, in a state where the abnormal state condition is satisfied only once, damage to the drive shaft (80) and the plain bearings (68, 78) is extremely negligible, and it is possible to continue operation of the compressor (50) in most cases.

Specifically, the bearing monitor (23) displays, on the display (16) of the remote control unit (15), an indication indicating that the plain bearings (68, 78) are poorly lubricated. This indication may be, for example, character information such as "Compressor in Abnormal State" or an error code corresponding to poor lubrication on the plain bearings (68, 78).

Surface Roughness of Drive Shaft

As described above, in this embodiment, the surface roughness Ra of each of the main journal portion (82) and the eccentric shaft portion (85) of the drive shaft is greater than or equal to 0.05 µm. The reason for this will now be described with reference to FIGS. 4 and 5.

Figure 4:
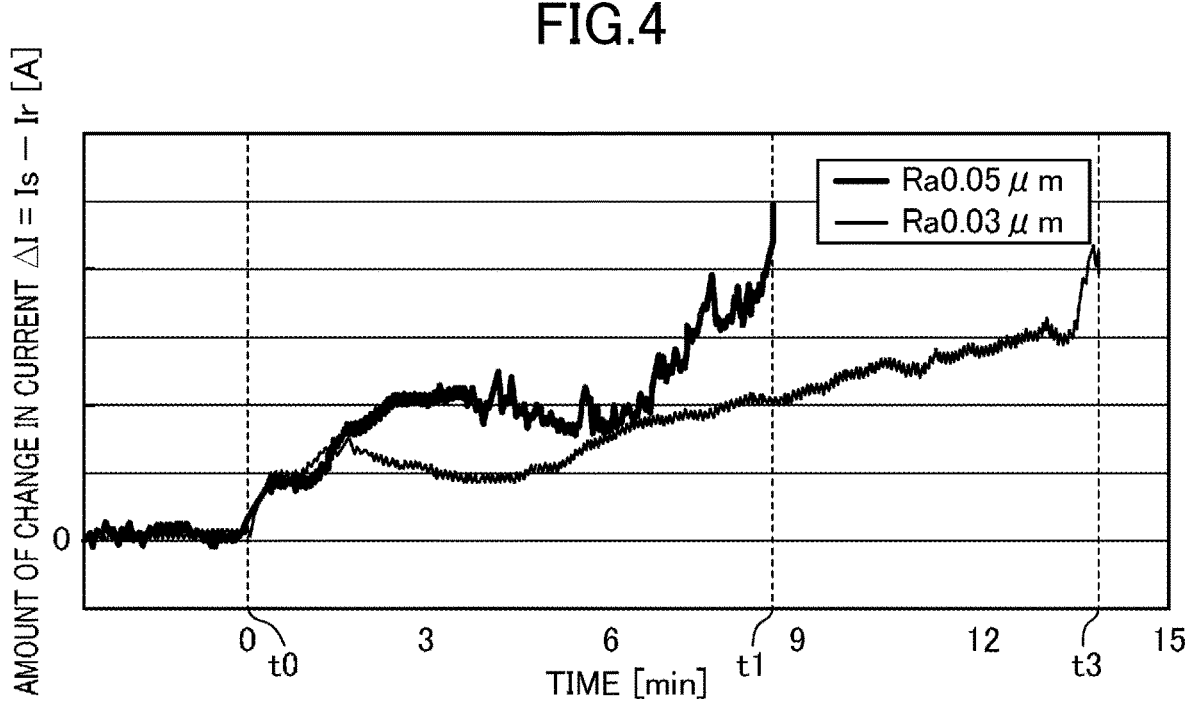
FIG. 4 is a graph showing temporal changes in the amount of change in current during an oil removal test, and shows a situation where the surface roughness Ra of a journal portion is 0.05 μm and a situation where the surface roughness Ra is 0.03 μm.
Figure 5:
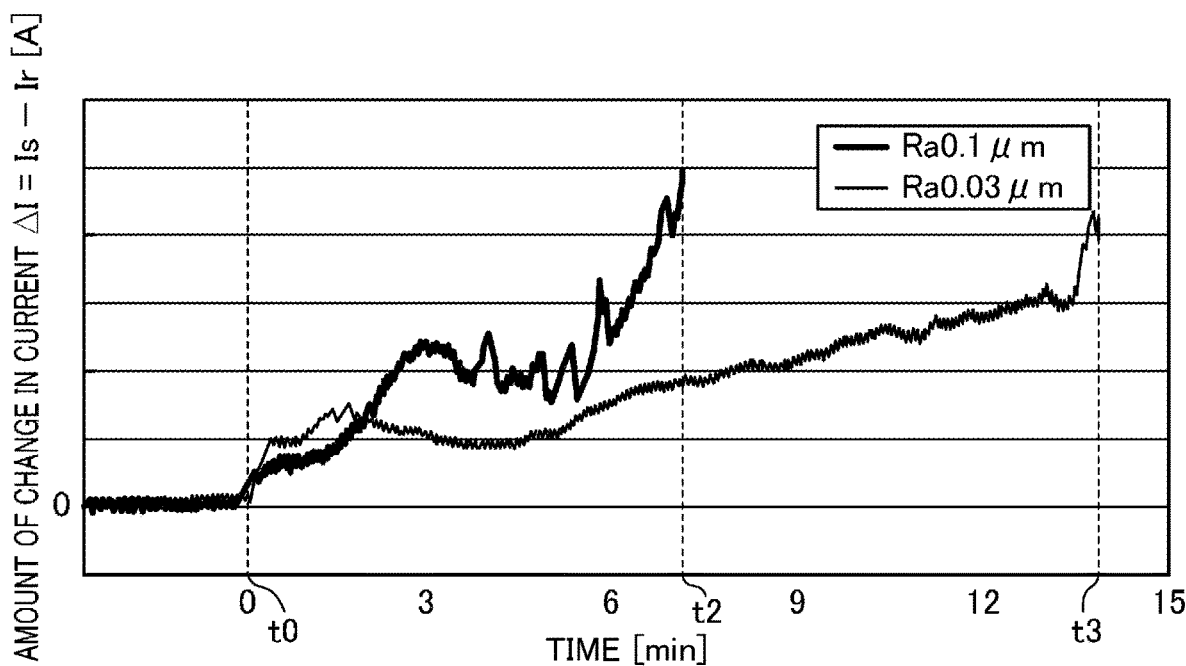
FIG. 5 is a graph showing temporal changes in the amount of change in current during the oil removal test, and shows a situation where the surface roughness Ra of the journal portion is 0.1 μm and the situation where the surface roughness Ra is 0.03 μm.

FIGS. 4 and 5 are graphs showing temporal changes in the amount $\Delta I$ of change in current during an oil removal test in which lubricant is discharged from the casing (51) during operation of the compressor (50). The amount $\Delta I$ of change in current is a value obtained by subtracting the rated current Ir in the operating state of the compressor (50) at that moment from the value Is measured by the current sensor (46) ($\Delta I = Is - Ir$). In the oil removal test, the driving current of the compressor (50) is adjusted so that the rotational speed of the electric motor (55) is kept constant.

The thick solid line shown in FIG. 4 indicates temporal changes in the amount $\Delta I$ of change in current in a situation where the surface roughness Ra of each of the main journal portion (82) and the eccentric shaft portion (85) is 0.05 The thick solid line shown in FIG. 5 indicates temporal changes in the amount $\Delta I$ of change in current in a situation where the surface roughness Ra of each of the main journal portion (82) and the eccentric shaft portion (85) is 0.1 The thin solid line shown in each of FIGS. 4 and 5 indicates temporal changes in the amount $\Delta I$ of change in current in a situation where the surface roughness Ra of each of the main journal portion (82) and the eccentric shaft portion (85) is 0.03 µm.

As shown in FIGS. 4 and 5, in both of the situations where the surface roughness Ra of each of the main journal portion (82) and the eccentric shaft portion (85) is 0.05 µm and 0.1 µm, the amount $\Delta I$ of change in current gradually increases after the start of the discharge of the lubricant, at the time t0, from the casing (51) of the compressor (50). The reason for this is that the thickness of an oil film formed between the drive shaft (80) and the plain bearings (68, 78) decreases, and the friction between the drive shaft (80) and the plain bearings (68,78) increases.

The amount $\Delta I$ of change in current pulsates thereafter. That is to say, the amount $\Delta I$ of change in current repeatedly and sharply increases and decreases. The reason for this is estimated as follows.

First, when relatively high projected portions among projections and recesses on the surface of the main journal portion (82) or the eccentric shaft portion (85) come into contact with the plain bearings (68, 78), the driving current of the compressor (50) momentarily increases. The projected portions of the surface of the main journal portion (82) or the eccentric shaft portion (85) which are in contact with the plain bearings (68, 78) are scraped off. The driving current of the compressor (50) is thus temporarily reduced. Thereafter, other projected portions of the surface of the main journal portion (82) or the eccentric shaft portion (85) are brought into contact with the plain bearings (68, 78), and the driving current of the compressor (50) momentarily increases again. As can be seen, if poor lubrication occurs in the case where the surface roughness Ra of each of the main journal portion (82) and the eccentric shaft portion (85) is greater than or equal to 0.05 the occurrence and release of the solid contact between the main journal portion (82) or the eccentric shaft portion (85) and an associated one of the plain bearings (68, 78) are repeated. As a result, the amount $\Delta I$ of change in current is estimated to increase and decrease repeatedly and sharply.

After the amount $\Delta I$ of change in current pulsates for a certain period, the amount $\Delta I$ of change in current rapidly increases. The main journal portion (82) or the eccentric shaft portion (85) and the plain bearing (68, 78) seize up at the time t1 in FIG. 4 and at the time t2 in FIG. 5.

Meanwhile, also in the case where the surface roughness Ra of each of the main journal portion (82) and the eccentric shaft portion (85) is 0.03 µm, the amount ΔI of change in current gradually increases after the start of discharge of the lubricant from the casing (51) of the compressor (50) at the time t0. Thereafter, the amount ΔI of change in current gradually increases without pulsation. The main journal portion (82) or the eccentric shaft portion (85) and the plain bearing (68, 78) seize up at the time t3. The reason for this is estimated as follows.

Since the projections and recesses on the surface of each of the main journal portion (82) and the eccentric shaft portion (85) are very small in this case, the phenomenon that occurs in the case where the main journal portion (82) and the eccentric shaft portion (85) have the surface roughness Ra of greater than or equal to 0.05 µm (i.e., the phenomenon in which the occurrence and release of the solid contact between the main journal portion (82) or the eccentric shaft portion (85) and the plain bearing (68, 78) are repeated) does not occur, and once the thickness of an oil film is reduced to or below a certain thickness, a relatively large region of the surface of the main journal portion (82) or the eccentric shaft portion (85) and the plain bearing (68, 78) seize up.

As can be seen, if the surface roughness Ra of each of the main journal portion (82) and the eccentric shaft portion (85) is less than 0.05 µm, the amount ΔI of change in current does not pulsate until the main journal portion (82) or the eccentric shaft portion (85) and the plain bearing (68, 78) seize up due to poor lubrication. This may prevent the abnormal state condition from being satisfied. To address this problem, in this embodiment, the surface roughness Ra of each of the main journal portion (82) and the eccentric shaft portion (85) is set to be greater than or equal to 0.05 µm.

If the surface roughness Ra of each of the main journal portion (82) and the eccentric shaft portion (85) is excessively large, an excessively large friction loss occurs between the main journal portion (82) or the eccentric shaft portion (85) and the plain bearing (68, 78). This may reduce the efficiency of the compressor (50). Thus, the surface roughness Ra of each of the main journal portion (82) and the eccentric shaft portion (85) is preferably less than or equal to 0.4 µm, more preferably less than or equal to 0.3 µm, further preferably less than or equal to 0.2 µm, and still preferably less than or equal to 0.1 µm.

In one preferred embodiment, the surface roughness Ra of the auxiliary journal portion (83) of the drive shaft (80) according to this embodiment is approximately equal to the surface roughness Ra of each of the main journal portion (82) and the eccentric shaft portion (85), but does not need to be greater than or equal to 0.05 µm. The load acting on the auxiliary journal portion (83) is smaller than the load acting on the main journal portion (82) and the eccentric shaft portion (85). Thus, poor lubrication does not usually cause damage to the auxiliary journal portion (83) earlier than to the main journal portion (82) and the eccentric shaft portion (85). Thus, even if the surface roughness Ra of the auxiliary journal portion (83) is less than 0.05 µm, poor lubrication causes the amount ΔI of change in current to pulsate as long as the surface roughness Ra of each of the main journal portion (82) and the eccentric shaft portion (85) is greater than or equal to 0.05 µm. As a result, the abnormal state condition is satisfied.

Advantages of First Embodiment

The compressor unit (40) according to this embodiment includes the compressor (50) and the bearing monitor (23). The compressor (50) includes the compression mechanism (60) configured to suck and compress a fluid, the electric motor (55), the drive shaft (80) that is coupled to the electric motor (55) and drives the compression mechanism (60), and the main bearing portion (68) and the boss (78) serving as plain bearings that respectively support the journal portions (82, 85) of the drive shaft (80). The bearing monitor (23) is configured to perform the abnormal-state operation for coping with poor lubrication on one or both of the main bearing portion (68) and the boss (78) if the abnormal state condition indicating that the rate RI of change of current (which is the amount of change in the driving current for driving the compressor (50) per unit time) has exceeded the first reference value is satisfied. At least the main journal portion (82) and the eccentric shaft portion (85) of the drive shaft (80) have a surface roughness Ra greater than or equal to 0.05 µm.

In this embodiment, if a predetermined abnormal state condition is satisfied, the bearing monitor (23) performs an abnormal-state operation for coping with poor lubrication on the plain bearings (68, 78). The abnormal state condition is a condition indicating that the rate RI of change of the driving current of the compressor (50) has exceeded the first reference value. When pulsation of the driving current occurs, the driving current drastically changes. Thus, the abnormal state condition is satisfied.

In this embodiment, the main journal portion (82) and the eccentric shaft portion (85) of the drive shaft (80) have a surface roughness Ra greater than or equal to 0.05 µm. For this reason, if the amount of oil supplied to the plain bearings (68, 78) is insufficient, and poor lubrication thus occurs, the driving current pulsates. Thus, according to this embodiment, monitoring the rate RI of change of the driving current can increase the chance to detect poor lubrication on the plain bearings (68, 78).

The bearing monitor (23) according to this embodiment is configured to calculate the rated current Ir in the operating state of the compressor (50) at the time of determination regarding whether the abnormal state condition is satisfied or not, and use, as the abnormal state condition, the condition that a value obtained by dividing the rate RI of change of current by the calculated rated current Ir (i.e., the generalized rate RIg of change of current) exceeds the determination reference value H (the second reference value). The rated current Ir is the driving current of the normally operating compressor (50).

The bearing monitor (23) according to this embodiment calculates the rated current Ir in the operating state of the compressor (50) at the time of determination regarding whether the abnormal state condition is satisfied or not. If the value obtained by dividing the rate RI of change of current by the rated current Ir calculated by the bearing monitor (23) (i.e., the generalized rate RIg of change of current) exceeds the determination reference value H, it can be determined that the rate RI of change of current has exceeded the first reference value (i.e., the abnormal state condition is satisfied). In this state in which the generalized rate RIg of change of current exceeds the determination reference value H, the bearing monitor (23) according to this embodiment performs the abnormal-state operation.

The value of the rate RI of change of current which makes it possible to determine that the plain bearings (68, 78) are poorly lubricated varies depending on the operating state of the compressor (50) at that moment. More specifically, the greater the rated current Ir in the operating state of the compressor (50) at that moment, the greater the value of the rate RI of change of current which makes it possible to determine that the plain bearings (68, 78) are poorly lubricated becomes. For this reason, in order to determine whether the plain bearings (68, 78) are poorly lubricated or not through comparison of the rate RI of change of current with the first reference value, the first reference values that differ depending on the operating states of the compressor (50) need to be stored in the bearing monitor (23), and the first reference value corresponding to the operating state of the compressor (50) at the time of this determination needs to be compared with the rate of change of current.

In contrast, in this embodiment, whether the abnormal state condition is satisfied or not is determined through comparison, with the determination reference value H, of the value (i.e., the generalized rate RIg of change of current) obtained by dividing the rate RI of change of current by the rated current Ir calculated by the bearing monitor (23) at the time of determination regarding whether the abnormal state condition is satisfied or not. Thus, the bearing monitor (23) of the present embodiment can determine whether the abnormal state condition is satisfied or not by storing one type of determination reference value H in advance and comparting the generalized rate RIg of change of current with the one type of determination reference value H even when the compressor (50) is in any operating state.

The bearing monitor (23) according to this embodiment is configured to perform, as the abnormal-state operation, an operation for changing the operating state of the compressor (50) from the normal state in which the abnormal state condition is not satisfied to the lightly loaded state in which the load acting on the plain bearings (68, 78) is smaller than a load at the time of determination regarding whether the abnormal state condition is satisfied or not.

When the operating state of the compressor (50) is the lightly loaded state, the load acting on the plain bearings (68, 78) is smaller than that at the time of determination regarding whether the abnormal state condition is satisfied or not. Thus, according to this embodiment, it is possible to reduce the degree of damage to the main journal portion (82) and the eccentric shaft portion (85) of the drive shaft (80) and to the main bearing portion (68) and the boss (78).

In the bearing monitor (23) according to this embodiment, the rotational speed of the compressor (50) in the lightly loaded state is lower than the rotational speed at the time of determination regarding whether the abnormal state condition is satisfied or not. If the abnormal state condition is satisfied, the bearing monitor (23) according to this embodiment sets the rotational speed of the compressor (50) to be lower than that at the time of determination regarding whether the abnormal state condition is satisfied or not. This reduces the load acting on the main bearing portion (68) and the boss (78) serving as plain bearings. It is therefore possible to reduce the degree of damage to the main journal portion (82) and the eccentric shaft portion (85) of the drive shaft (80) and to the main bearing portion (68) and the boss (78).

The bearing monitor (23) according to this embodiment is configured to place the compressor (50) in the lightly loaded state for a predetermined period, and then restore the operating state of the compressor (50) to the normal state. In other words, if the abnormal state condition is satisfied, the bearing monitor (23) switches the operating state of the compressor (50) from the normal state to the lightly loaded state, maintains the compressor (50) in the lightly loaded state for a predetermined period, and then restores the operating state of the compressor (50) from the lightly loaded state to the normal state.

As described above, it is estimated that the reason why the amount ΔI of change in current pulsates when poor lubrication on the plain bearings (68, 78) occurs is that the occurrence and release of the solid contact between the main journal portion (82) or the eccentric shaft portion (85) and the plain bearing (68, 78) are repeated. When poor lubrication on the plain bearings (68, 78) occurs, relatively high projected portions among the projections and recesses on the surface of the main journal portion (82) or the eccentric shaft portion (85) come into contact with the plain bearing (68, 78) and are scraped off. It is therefore estimated that poor lubrication on the plain bearings (68, 78) causes the phenomenon in which the surface roughness of the main journal portion (82) or the eccentric shaft portion (85) is reduced (so-called uniformization).

The bearing monitor (23) according to this embodiment is configured to perform, as the abnormal-state operation, an operation for giving a warning of poor lubrication on the plain bearings (68, 78). According to this embodiment, it is possible to notify a manager or any other suitable person for the air conditioner (10) that the compressor (50) is in an abnormal state.

Second Embodiment

A second embodiment will be described below. An air conditioner (10) of this embodiment is a modified version of the air conditioner (10) of the first embodiment, in which the configuration of the compressor (50) has been changed. A control system (20) of the air conditioner (10) of this embodiment performs the same operation as that of the control system (20) of the first embodiment. A compressor (50) of this embodiment will now be described.

Compressor

Figure 6:
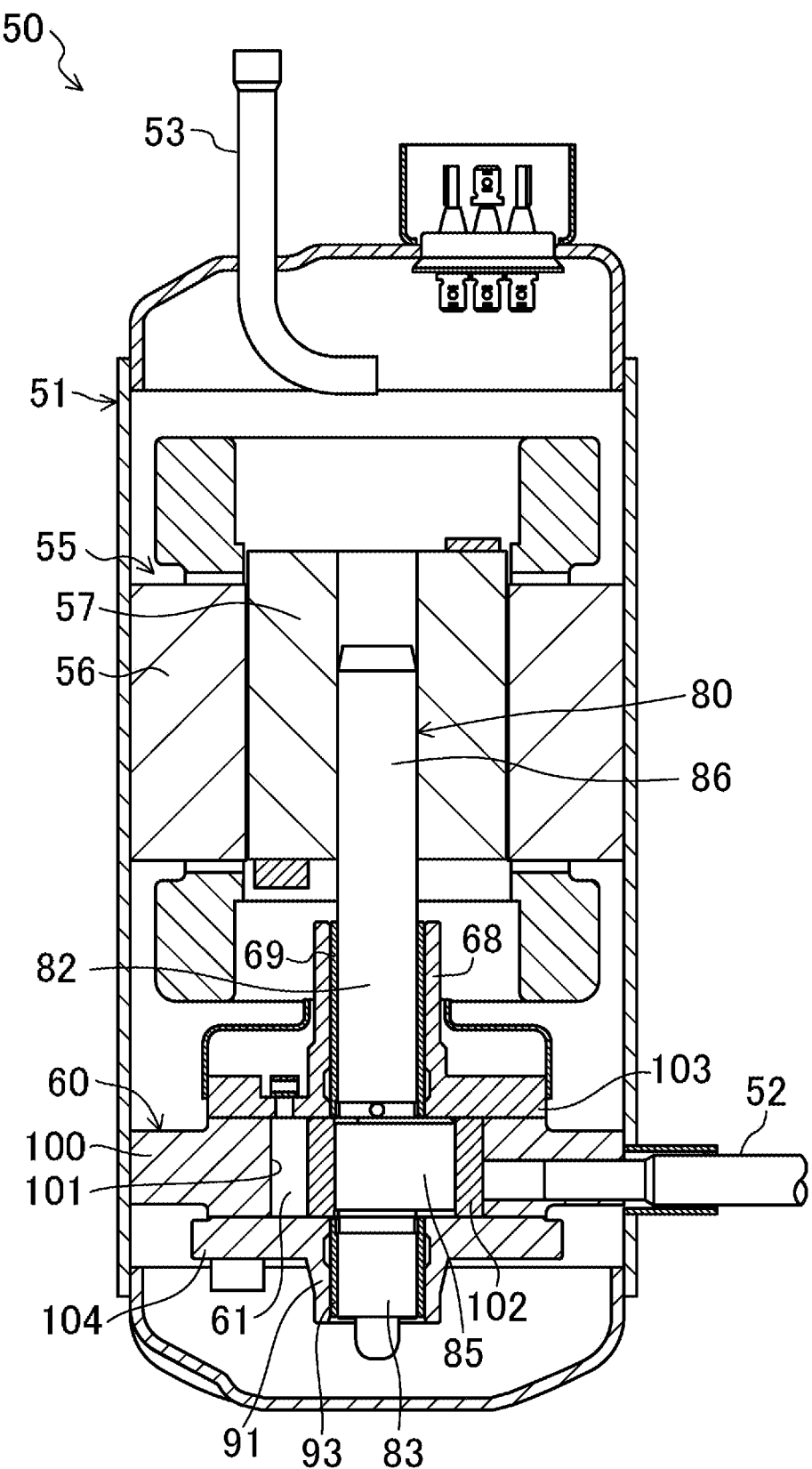
FIG. 6 is a vertical cross-sectional view of a compressor (rotary compressor) according to a second embodiment.

As shown in FIG. 6, the compressor (50) is a hermetic rotary compressor. The compressor (50) includes a compression mechanism (60), an electric motor (55), and a drive shaft (80), which are housed in a casing (51).

Casing

The casing (51) is a cylindrical closed container with both ends closed. The casing (51) is arranged so that its axial direction coincides with a vertical direction. The electric motor (55) is arranged above the compression mechanism (60) in the internal space of the casing (51). A suction pipe (52) passes through the barrel of the casing (51), and is connected to the compression mechanism (60). A discharge pipe (53) passes through the top of the casing (51), and is open in the internal space of the casing (51).

Compression Mechanism

The compression mechanism (60) is a swing-piston, rotary fluid machine. This compression mechanism (60) includes a cylinder (100), a piston (102), a front head (103), and a rear head (104).

The cylinder (100) is a thick disk-shaped member having a cylinder bore (101) at its center. The thick cylindrical piston (102) is arranged in the cylinder bore (101). An eccentric shaft portion (85) of the drive shaft (80), which will be described later, is inserted into the piston (102). In the compression mechanism (60), a compression chamber (61) is formed between the wall surface of the cylinder bore (101) and the outer peripheral surface of the piston (102). Although not shown, the compression mechanism (60) is provided with a blade partitioning the compression chamber (61) into a high-pressure chamber and a low-pressure chamber.

The front head (103) is a plate-shaped member blocking the upper end face of the cylinder (100). A central portion of the front head (103) includes a cylindrical main bearing portion (68). A bearing metal (69) is fitted into the main bearing portion (68). The main bearing portion (68) including this bearing metal (69) is a plain bearing that supports the drive shaft (80). The rear head (104) is a plate-shaped member blocking the lower end face of the cylinder (100). A central portion of the rear head (104) includes a cylindrical auxiliary bearing portion (91). A bearing metal (93) is fitted into the auxiliary bearing portion (91). The auxiliary bearing portion (91) including this bearing metal (93) is a plain bearing that supports the drive shaft (80).

Electric Motor

The electric motor (55) includes a stator (56) and a rotor (57). The stator (56) is fixed to the barrel of the casing (51). The rotor (57) is disposed inside the stator (56). The drive shaft (80) is inserted into the rotor (57).

Drive Shaft

The drive shaft (80) includes a main journal portion (82), an auxiliary journal portion (83), an eccentric shaft portion (85), and an upper shaft portion (86). The auxiliary journal portion (83), the eccentric shaft portion (85), the main journal portion (82), and the upper shaft portion (86) are sequentially arranged from the lower end to the upper end of the drive shaft (80).

The main journal portion (82), the auxiliary journal portion (83), and the upper shaft portion (86) are each formed in a columnar shape, and are coaxial with one another. The main journal portion (82) is inserted into the main bearing portion (68) of the front head (103). The auxiliary journal portion (83) is inserted into the auxiliary bearing portion (91) of the rear head (104). The drive shaft (80) has its main journal portion (82) supported by the main bearing portion (68), and has its auxiliary journal portion (83) supported by the auxiliary bearing portion (91). The upper shaft portion (86) is inserted into the rotor (57) of the electric motor (55). The rotor (57) is fixed to the upper shaft portion (86).

The eccentric shaft portion (85) is formed in a columnar shape having a larger diameter than the main journal portion (82) and the auxiliary journal portion (83). A shaft center of the eccentric shaft portion (85) is substantially parallel to that of each of the main journal portion (82) and the auxiliary journal portion (83), and is eccentric with the shaft center of each of the main journal portion (82) and the auxiliary journal portion (83). The eccentric shaft portion (85) is inserted into the piston (102). The eccentric shaft portion (85) forms a journal portion that supports the piston (102).

Although not shown, an oil supply passage (87) is formed in the drive shaft (80). The oil supply passage (87) is a passage through which lubricant (refrigerating machine oil) stored at the bottom of the casing (51) is supplied to sliding portions. The lubricant is supplied through the oil supply passage (87) to the main bearing portion (68), the auxiliary bearing portion (91), the piston (102), and the sliding portions of the drive shaft (80).

Surface Roughness of Drive Shaft

The main journal portion (82), the auxiliary journal portion (83), and the eccentric shaft portion (85) of the drive shaft (80) according to this embodiment each form a journal portion supported by an associated one of the plain bearings. The main journal portion (82) and the eccentric shaft portion (85) of the drive shaft (80) according to this embodiment each have a surface roughness Ra greater than or equal to 0.05 μm. The surface roughness Ra is an arithmetic average roughness. The reason why the surface roughness Ra of each of the main journal portion (82) and the eccentric shaft portion (85) is set to be greater than or equal to 0.05 μm has been described with reference to the first embodiment. Just like the first embodiment, the surface roughness Ra of each of the main journal portion (82) and the eccentric shaft portion (85) is preferably less than or equal to 0.4 μm, more preferably less than or equal to 0.3 μm, further preferably less than or equal to 0.2 μm, and still preferably less than or equal to 0.1 μm.

In one preferred embodiment, the surface roughness Ra of the auxiliary journal portion (83) of the drive shaft (80) according to this embodiment is approximately equal to the surface roughness Ra of each of the main journal portion (82) and the eccentric shaft portion (85), but does not need to be greater than or equal to 0.05 μm. Just like the first embodiment, the load acting on the auxiliary journal portion (83) of the drive shaft (80) according to this embodiment is smaller than the load acting on the main journal portion (82) and the eccentric shaft portion (85). Thus, for the same reason as that described with reference to the drive shaft (80) of the first embodiment, the surface roughness Ra of the auxiliary journal portion (83) of the drive shaft (80) according to this embodiment does not need to be greater than or equal to 0.05 μm.

Other Embodiments

In each of the foregoing embodiments, the bearing monitor (23) of the main controller (21) may be configured to perform, as the abnormal-state operation, either an "operation for changing the operating state of the compressor (50) from the normal state to the lightly loaded state" or an "operation for giving a warning of poor lubrication on the plain bearings (68, 78)."

In each of the foregoing embodiments, the bearing monitor (23) of the main controller (21) may be configured to determine that the abnormal state condition is satisfied when the rate RI of change of current exceeds the first reference value. In other words, the bearing monitor (23) may determine whether the abnormal state condition is satisfied or not through comparison of the rate RI of change of current with the first reference value, without calculating the generalized rate Rig of change of current. In this case, the bearing monitor (23) stores in advance the first reference values that differ depending on the operating states of the compressor (50). The bearing monitor (23) determines whether the abnormal state condition is satisfied or not by determining the first reference value corresponding to the operating state of the compressor (50) at the time of the determination and comparing the rate RI of change of current with the determined first reference value.

While the embodiments and variations thereof have been described above, it will be understood that various changes in form and details may be made without departing from the spirit and scope of the claims. The foregoing embodiments and variations thereof may be combined and replaced with each other without deteriorating intended functions of the present disclosure.

As can be seen from the foregoing description, the present disclosure is useful for a refrigeration apparatus.

The invention claimed is:

1. A refrigeration apparatus comprising:
  a compressor including
    a compression mechanism configured to suck and compress a fluid,
    an electric motor,
    a drive shaft coupled to the electric motor to drive the compression mechanism, and a plain bearing that supports a journal portion of the drive shaft;

a refrigerant circuit with the compressor connected thereto to circulate a refrigerant to perform a refrigeration cycle; and a controller including a CPU that executes a control program and a memory that stores the control program, the controller being configured to perform an operation if a predetermined determination condition is satisfied, the determination condition being a condition on a driving current usable to drive the compressor, the journal portion of the drive shaft having a surface roughness of at least 0.05 μm, an amount of change in the driving current per unit time being a rate of change of current, the driving current of the compressor that is normally operating is defined as a rated current, and the determination condition being a condition that a value obtained by dividing the rate of change of current by the rated current in an operating state of the compressor at a time of determination regarding whether the determination condition is satisfied or not exceeds a reference value.

2. The refrigeration apparatus of claim 1, wherein the controller is configured to perform, as the operation, an operation to change the operating state of the compressor from a normal state in which the determination condition is not satisfied to a lightly loaded state in which a load acting on the plain bearing is smaller than a load at the time of determination regarding whether the determination condition is satisfied or not.

3. The refrigeration apparatus of claim 2, wherein a rotational speed of the compressor in the lightly loaded state is lower than a rotational speed of the compressor at the time of determination regarding whether the determination condition is satisfied or not.

4. The refrigeration apparatus of claim 3, wherein the controller is configured to place the compressor in the lightly loaded state for a predetermined period, and then restore the operating state of the compressor to the normal state.

5. The refrigeration apparatus of claim 2, wherein the controller is configured to place the compressor in the lightly loaded state for a predetermined period, and then restore the operating state of the compressor to the normal state.

6. The refrigeration apparatus of claim 1, wherein the controller is configured to perform, as the operation, an operation to give a warning.

* * * * *